United States Patent

Douglass

[15] 3,675,914
[45] July 11, 1972

[54] ENGINE STAND

[72] Inventor: Carl E. Douglass, c/o Douglass Products, Huntingdon, Pa. 16652

[22] Filed: Oct. 29, 1969

[21] Appl. No.: 872,084

[52] U.S. Cl. ................................. 269/55, 73/116, 248/3, 269/69, 269/74
[51] Int. Cl. .................................................. B23q 1/04
[58] Field of Search ............... 269/69, 55, 74, 321 A; 248/3; 73/116

[56] References Cited

UNITED STATES PATENTS 2,654,147  10/1953  Wilson .............................. 248/3 X

FOREIGN PATENTS OR APPLICATIONS 607,803  9/1948  Great Britain ..................... 269/69
359,238  9/1922  Germany ............................ 269/74
622,526  3/1949  Great Britain ..................... 269/69

*Primary Examiner*—Francis S. Husar
*Attorney*—Karl W. Flocks

[57] ABSTRACT

A stand upon which an engine may be mounted and rotated utilizing a wheel and spoke arrangement for turning by hand with movable weights on spokes and rim for counterbalancing the weight of the engine, and a locking pin through the hub assembly to hold the engine in the desired position.

4 Claims, 2 Drawing Figures

PATENTED JUL 11 1972   3,675,914

INVENTOR
CARL E. DOUGLASS

BY [signature]
ATTORNEY

ENGINE STAND

BACKGROUND OF THE INVENTION

The present invention relates to an improved engine mounting stand and more particularly to a stand for use with heavier type engines.

The engine stand of the present invention allows the turning by hand of the engine for purposes of inspection and work thereon utilizing a simple trouble-free mechanism while at the same time maintaining ease of turning of the engine upon its mounting.

SUMMARY OF THE INVENTION

Accordingly, the present invention is basically an engine stand with the engine support mounted for rotation upon a supported shaft connected at its opposite end to the center of a spoked wheel counterbalanced for unbalance of engine weight by means of weights mounted on either the spokes or the rim of the wheel or on both spokes and rim.

Furthermore, the invention utilizes a locking pin passed through the wheel hub to the vertical supporting column to maintain the wheel and engine in a desired position.

BRIEF DESCRIPTION OF THE DRAWINGS

These and other objects and advantages will become apparent from the following specification and accompanying drawings wherein there is illustrated a preferred form of the invention. In the drawings.

DESCRIPTION OF THE PREFERRED EMBODIMENT

Figures 1, 2:
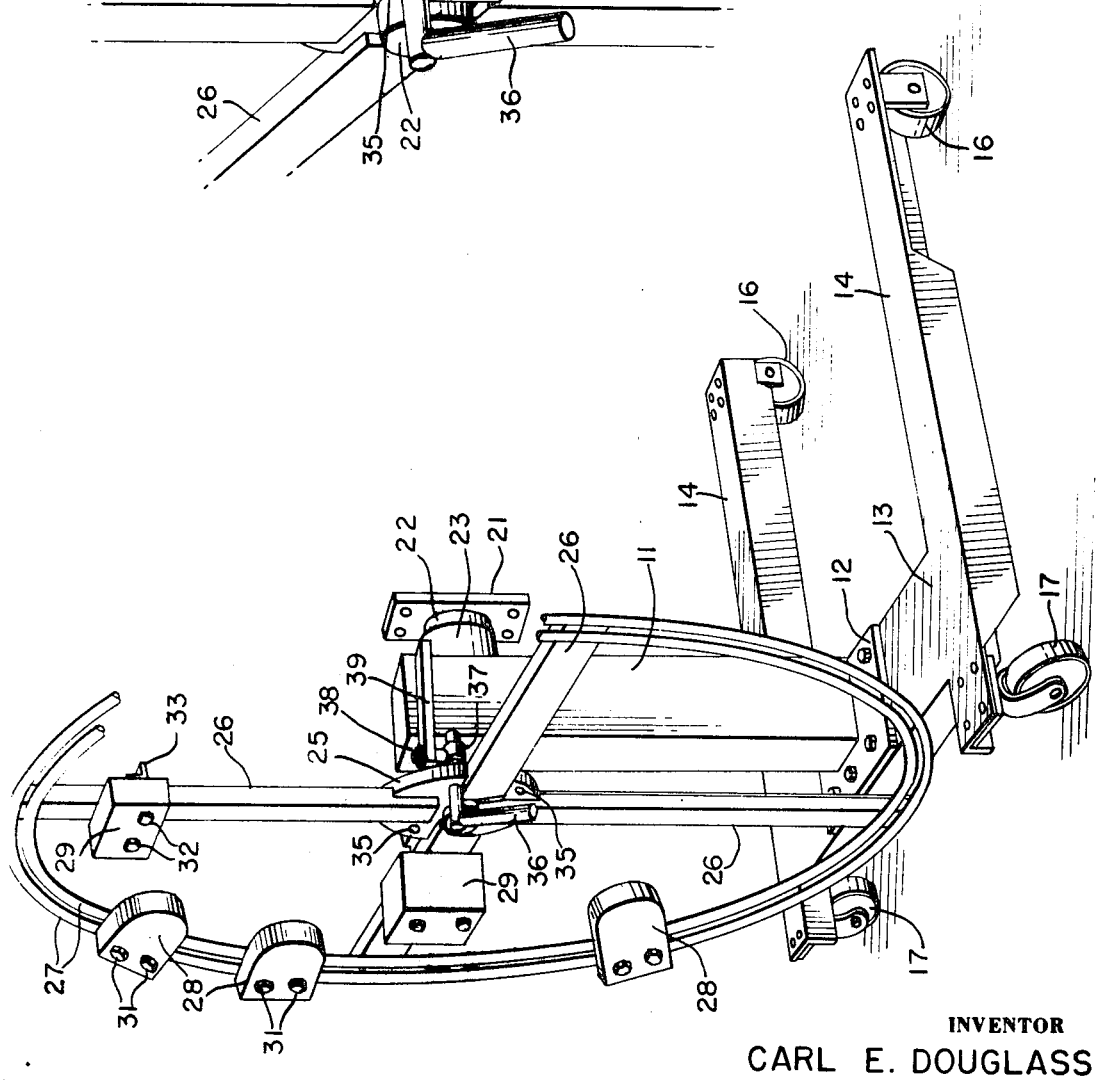
FIG. 1 is a perspective view of a preferred embodiment of the engine stand of the present invention with a portion broken away fro a clearer view.
FIG. 2 is an enlarged partially sectioned view of the hub assembly and locking mechanism for maintaining the position of the engine.

The engine stand shown in the perspective view of FIG. 1 is supported by a vertical support column 11 mounted by attachment plate 12 to channel connecting member 13 which member 13 is mounted between and connected to channel base legs 14. Channel base legs 14 each have a non-swivel type caster 16 attached at one end and a swivel type caster 17 attached at the opposite end for easier movement of the whole engine stand whether or not an engine is mounted thereon.

Vertical support column 11 which is substantially centered on channel connecting member 13 between channel base legs 14 has the turning and engine support mechanism located at its upper portion which mechanism is also partially shown in the enlarged view of FIG. 2.

Base 21 for mounting engine plate adapters upon which the engine is mounted, is attached to a main shaft 22 which passes through main horizontal supporting member 23, the top portion of vertical support column 11 and a flange 25. Flange 25, mounted on the opposite end of main shaft 22 from base 21, is a portion of the hub assembly of the turning mechanism for rotation of an engine mounted on the stand.

Extending radially from flange 25 are spokes 26 upon which is mounted wheel rim 27 at their outer ends. Wheel rim 27, shown in FIG. 1, is shown as consisting of inner and outer rims so that movable weights 28 may be conveniently mounted thereon. Movable weights 29 may also be mounted on spokes 26. Movable weights 28 on the wheel rim 27 may be used alone, or movable weights 29 on spokes 26 may be used alone, or weights 28 and 29 may be used in conjunction with each other to distribute the rotational weight of an engine mounted on the stand so that the force required to rotate the engine by turning the wheel is evenly distributed around the rim thereby allowing the wheel to be turned easily by hand. In this manner a simple shaft arrangement without the need for gearing may be used for engine rotation. The mechanical advantage in this mechanism is obtained through the large diameter spoke and wheel rim arrangement.

Weights 28 are shown as attached to the rim 27 by nuts and bolts 31 wherein the bolts have enlarged portions (not shown) on their ends to hold them in position between the rim portions when the nuts are tightened on the bolts. Weights 29 are shown with nuts and bolts 32 which hold those weights onto spokes 26 when the nuts are tightened to draw the opposite ends of the bolts against angular bar 33 mounted on the opposite side of spoke 26. The manner of mounting movable weights 28 and 29 may be varied since the means described is only two of many possible ways in which this can be done conveniently and within the concept of the present invention.

When the engine has been rotated on the engine stand of the present invention it will be desired to stop the rotation at some point for further inspection or in a position convenient for work to be done on some portion of the engine. For this purpose a locking mechanism is included.

For purposes of locking the engine in certain positions of rotation a series of holes 35 are distributed around flange 25. An L-shaped locking pin 36 can be fitted into one of holes 35 as shown more clearly in FIG. 2. Pin 36 passes through hole 35 and into and through circular tubing support 37. Circular tubing support 37 is held in position against movement by a nut and bolt tightening pin 38 attached to a heavy member 39 securely attached to the side of vertical support column 11.

With the mechanism described and shown incorporated in an engine stand, quick and easy positioning and locking into position of an engine may be obtained. Also, quick release for repositioning is easily accomplished. This is done with mechanism less subject to wear than many prior art mechanisms while still maintaining ease of handling.

Within the concept of the present invention those skilled in the art will note variations in the details of structure such as different means for mounting of weights and the positioning thereof, and variations in the form of locking mechanism and also the use of various other locking mechanisms with the turning mechanism of the present invention, but the concept of the invention can be considered as including such variations not limited by the details of the preferred embodiment described in the specification and drawings.

I claim:

1. An engine stand for mounting of an engine thereon comprising
    a base,
    a vertical support member mounted on said base,
    shaft means supported in the upper portion of said vertical support member and rotatable in relation thereto,
    engine attachment means connected to one end portion of said shaft means,
    a wheel and a hub assembly attached to the opposite end portion of said shaft means from said engine attachment means, and
    adjustable weight means attached on said wheel assembly so as to balance the distribution of force required to turn said wheel assembly.

2. The engine stand of claim 1, further characterized by said wheel assembly including
    a plurality of spokes extending radially from said hub assembly and attached thereto at their inner ends,
    and a rim attached to said spokes at their outer ends,
    said adjustable weight means including at least one movable weight attached to at least one of said spokes.

3. The engine stand of claim 1, further characterized by said wheel assembly including
    a plurality of spokes extending radially from said hub assembly and attached thereto at their inner ends,
    and a rim attached to said spokes at their outer ends,
    said adjustable weight means including at least one movable weight attached to said rim.

4. The engine stand of claim 1, further characterized by said wheel assembly including
    a plurality of spokes extending radially from said hub assembly and attached thereto at their inner ends,
    and a rim attached to said spokes at their outer ends,
    said rim including outer and inner circular tubular portions, said adjustable weight means including at least one movable weight attached to said rim by means extending between said outer and inner portions.

* * * * *